United States Patent [19]
Mabuchi et al.

[11] 3,935,909
[45] Feb. 3, 1976

[54] ELECTRIC HAND TOOL

[75] Inventors: Kenichi Mabuchi, Tokyo; Yoshihisa Tsuchimochi, Ichikawa, both of Japan

[73] Assignee: Mabuchi Motor Co. Ltd., Tokyo, Japan

[22] Filed: Aug. 20, 1974

[21] Appl. No.: 498,981

[30] Foreign Application Priority Data
Aug. 28, 1973 Japan............................ 48-100918

[52] U.S. Cl............ 173/163; 51/170 PT; 51/170 T; 408/124; 310/50
[51] Int. Cl.² ........................................ H02K 7/14
[58] Field of Search......... 310/50, 47, 83; 173/163; 408/124, 126; 51/170 PT, 170 T, 170 R

[56] References Cited
UNITED STATES PATENTS

| | | | |
|---|---|---|---|
| 2,979,089 | 4/1961 | Piesker | 173/163 |
| 3,375,381 | 3/1968 | Tavel | 310/50 X |
| 3,734,207 | 5/1973 | Fishbein | 310/50 X |

FOREIGN PATENTS OR APPLICATIONS

| | | | |
|---|---|---|---|
| 896,886 | 5/1962 | United Kingdom | 408/124 |

*Primary Examiner*—Leonidas Vlachos

[57] ABSTRACT

An electric hand tool is disclosed which uses nickel-cadmium type cells to energize a small motor driving the tool. The speed of the motor is reduced by means of an epicyclic gear, requiring no increase in the diameter of the hand tool.

2 Claims, 1 Drawing Figure

ELECTRIC HAND TOOL

BACKGROUND OF THE INVENTION

1. Field of the Invention

This invention relates to an electric hand tool and, more particularly, to an electric hand tool which is driven by a small motor through a planetary reduction gear mechanism and in which the motor is energized by nickel-cadmium type cells having each a relief valve for releasing gas when the cell is overcharged.

2. Description of the Prior Art

Electric hand tools such as electric hand drills which have been so far known include those of the dry cell driven type in which dry cells are used to energize a small driving motor with a chuck holder on its shaft to removably support a tool such as a drill. In such a type of electric hand tool, however, it is necessary to use a relatively big motor because not very much current may be drawn from the dry cells. Moreover, it requires at least UM1 type dry cells and hence a space sufficient to accommodate them. Therefore the diameter of the conventional electric hand tool can be no less than about 3.5 centimeter, which is too big for convenience of operation, especially operation with a single hand. Further more, the UM1 type dry cell has the characteristic that its voltage decreases very largely during the earlier stages of its use and then decreases gradually; therefore the speed of rotation of the tool also decreases largely during the earlier time of the use of the cell. Another disadvantage of the dry cell type electric hand tool is that it requires high maintenance cost because the UM1 type dry cell is wasted after it has been used.

SUMMARY OF THE INVENTION

It is an object of the invention to provide a powerful electric hand tool which uses nickel-cadmium cells and which, though small in size, attains a great reduction ratio by means of a planetary gear mechanism.

It is another object of the invention to provide an electric hand tool comprising a body case equipped with the motor and a cell case containing the electric cells, in which the electric supply circuit is opened or closed by rotating said cases relatively to each other whereby omitting a supply switch projecting outwardly beyond the surface of the tool.

DETAILED DESCRIPTION OF THE EMBODIMENT

Figure 1:
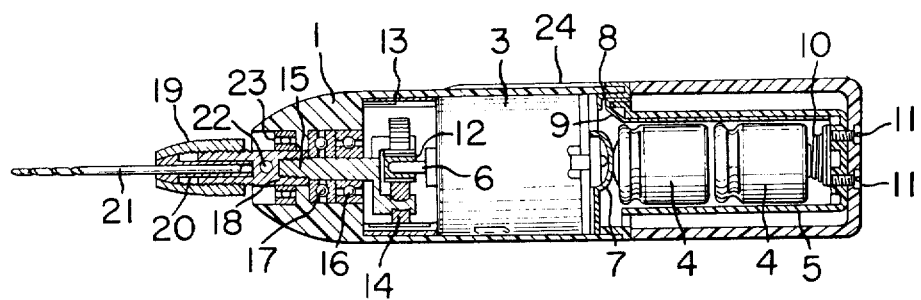
FIG. 1 is a side view, in cross-section, of an electric hand tool embodying the invention.

In the drawing, the reference numeral 1 shows a body case, and 2 a cell case holder. A small motor 3 is mounted inside of the body case 1, while a cell case 5 containing cells 4, 4 is held in the cell case holder 2.

The development of nickel-cadmium type cells is making progress and, particularly, there has been recently developed a nickel-cadmium type cell having a relief valve for releasing gas when it is overcharged. It has been ascertained that this cell has many advantages; for instance, it has an internal resistance small enough to afford a discharge current of as much as several amperes and, moreover, it may be charged in a few minutes even after it has been discharged so completely that its terminal voltage has become zero. Besides, this type of cell has the characteristics that its terminal voltage decreases little in the earlier stages of use and drops abruptly only at the end of its discharge. The cells 4, 4 used in the electric hand tool of the invention are nickel-cadmium cells of the type mentioned above having relief valves for releasing gas in the event of overcharging.

In the embodiment shown in FIG. 1, the motor 3 with its shaft 6 has its plus terminal connected to a cap-shaped part 7 and its minus terminal connected to a lug 8 supported along the peripheral inner wall of the body case 1 and fixed by being bent over the outer edge of the wall.

In the cell case 5 are placed cells 4, 4 as shown, with the negative electrode of the cell being connected through a spring 10 to a cell-negative-electrode lead 9. The cell-negative-electrode lead 9 goes along the inner wall of the cell case 5 toward its opening. The end of the lead 9 is secured to the peripheral outer edge of the cell case 5. The cell case 5 is fixed to the cell case holder 2 by means of screws 11.

When the body case 1 and the cell case holder 2 are fitted together integrally, the positive electrode of the cell 4 comes into electrical contact with said cap-shaped part 7. Under such circumstances, the relative rotation between the body case 1 and the cell case holder 2 will bring said lug 8 and cell-negative-electrode lead 9 into electrical contact with each other, whereby an electric circuit will be made for the motor 3 to be rotated.

On the shaft 6 of the motor is push fitted a pinion 12, with which is associated an epicyclic gear mechanism comprising a ring gear 13 and planetary gears 14. The numeral 15 shows a shaft carrying the planetary gears and supported in the body case 1 by a ball bearing 16 and a thrust bearing 17. The planetary gear shaft 15 is secured to the main shaft 18 carrying a chuck holder 19 for holding a tool such as a drill 21 by means of a drill holder 20. The numeral 22 shows a chuck fastening hole and, in removing the drill, a thin pin is passed through said fastening hole 22 to stop the main shaft 18 and then the chuck holder 19 is turned. The numeral 23 shows a ball bearing, and 24 shows projections serving to prevent the case body 1 from rolling as well as to indicate the switch position.

Figure 2:
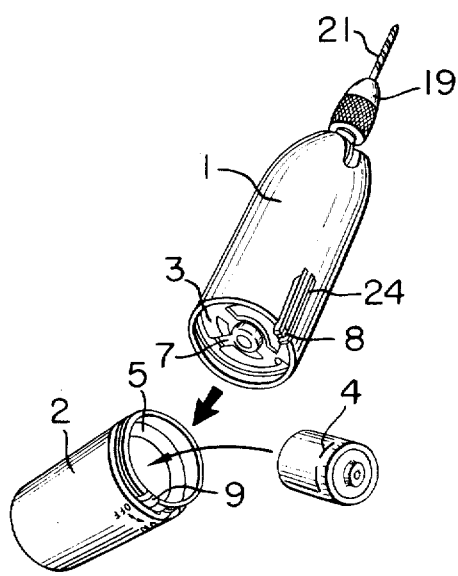
FIG. 2 is a perspective view of the same showing how to mount a cell therein.

As shown in FIG. 2, the mounting and removal of the cells 4, 4 may be carried out by disengaging the body case 1 and the cell case holder 2 and separating them.

Figure 3:
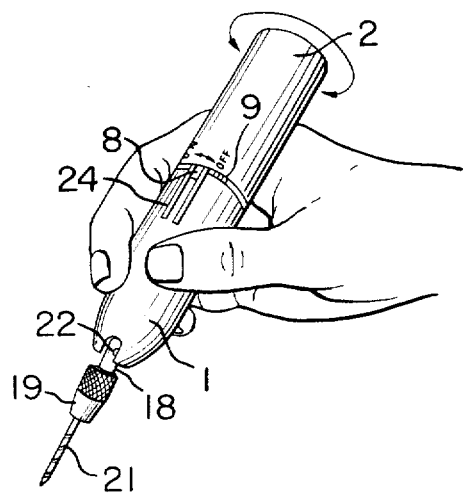
FIG. 3 is a perspective view of the same showing how to use it.

In operation the electric hand tool in accordance with the invention is held in a hand as shown in FIG. 3 and the cell case holder 2 is turned relative to the body case 1. Then, the motor 3 starts and the speed of its rotation is reduced through the epicyclic gear mechanism before it drives the drill 21. It is needless to say that grinding wheels of various shapes may be attached, instead of drills, as tools in the invention.

It is seen from the foregoing that the invention makes it possible to attain a great reduction ratio without increasing the outer diameter of the gear housing because of the use of a planetary gear. It also makes it possible to obtain a high speed of motor because it uses nickel-cadmium cells as mentioned before which are chargeable quickly and are of so small internal resistance as to present a large discharge current. Therefore, in accordance with the invention, a large driving torque can be obtained because said high speed rotation of the motor is reduced through an epicyclic gear enabling a large reduction ratio. The voltage across such nickel-cadmium type cells as mentioned above hardly decreases until just before they discharge completely. Therefore, the hand tool in accordance with invention can offer sufficiently large driving torque all the time during operation, as compared with conventional electric hand tools using UM1 type dry cells in which the driving torque tends to fall largely with the consumption of the cells. Furthermore, in accordance with the invention, even after the cell has been discharged to its zero voltage, it may conveniently be charged up in a few minutes. Thus it is economical as compared with the conventional cell which is to be wasted after use. Also in accordance with the invention, it is possible to provide an electric hand tool having a diameter of about 2.5 cm, which is suitable for operation with a single hand, since it uses cells of small diameter (nearly equal in diameter to U3 type dry cells, but about ⅓ thereof in length) as well as a speed reduction by means of a epicyclic mechanism.

What is claimed is:

1. An electric hand tool comprising a body case, a cell case coupled to said body case for relative rotation with respect thereto, a motor contained within said body case and including an output shaft, nickel-cadmium battery means contained within said cell case and adapted to energize said motor, contact means electrically coupled to said battery means, said contact means being movable between a circuit open position and a circuit closed position upon rotation of said cell case, a planetary gearing system having an input end coupled to the output shaft of said motor and an output end journalled in said body case, a tool holding chuck drivingly coupled to the output end of said planetary gearing system and means for selectively preventing rotation of the output end of said planetary gearing system when the tool holding chuck is to be opened for the removal of the tool.

2. The electric hand tool according to claim 1, wherein said means for preventing rotation of said output end of said planetary gearing system comprises a slot formed in said body casing at the end thereof adjacent said tool holding chuck and a hole formed in the output end of said planetary gearing system whereby, when a pin is placed in said slot and in said hole, rotation of said output end of said planetary gearing system relative to said body case is prevented to thereby permit said tool holding chuck to be opened.

* * * * *